(12) United States Patent
Sermone et al.

(10) Patent No.: US 12,502,363 B2
(45) Date of Patent: *Dec. 23, 2025

(54) KETAMINE AND KETAMINE/NAP FOR TREATMENT OF ADNP SYNDROME AND RELATED NEUROLOGICAL CONDITIONS

(71) Applicant: ADNP Kids Research Foundation, Brush Prairie, WA (US)

(72) Inventors: Sandra Sermone, Brush Prairie, WA (US); Matthew Christopher Davis, Vestavia Hills, AL (US)

(73) Assignees: ADNP Kids Research Foundation, Brush Prairie, WA (US); Sandra Sermone, Brush Prairie, WA (US); Matthew Christopher Davis, Vestavia Hill, AL (US)

( * ) Notice: Subject to any disclaimer, the term of this patent is extended or adjusted under 35 U.S.C. 154(b) by 470 days.

This patent is subject to a terminal disclaimer.

(21) Appl. No.: 17/616,634

(22) PCT Filed: Jun. 4, 2020

(86) PCT No.: PCT/US2020/036103
§ 371 (c)(1),
(2) Date: Dec. 3, 2021

(87) PCT Pub. No.: WO2020/247615
PCT Pub. Date: Dec. 10, 2020

(65) Prior Publication Data
US 2022/0257536 A1 Aug. 18, 2022

Related U.S. Application Data

(60) Provisional application No. 62/857,210, filed on Jun. 4, 2019.

(51) Int. Cl.
*A61K 31/135* (2006.01)
*A61K 38/18* (2006.01)

(52) U.S. Cl.
CPC .......... *A61K 31/135* (2013.01); *A61K 38/18* (2013.01)

(58) Field of Classification Search
CPC .... A61K 31/135; A61K 38/18; A61K 31/167; A61K 31/17; A61K 31/18; A61K 31/4725; A61K 31/55; A61K 9/0014; A61K 45/06; A61K 31/185; A61P 25/28
See application file for complete search history.

(56) References Cited

U.S. PATENT DOCUMENTS

| | | |
|---|---|---|
| 4,994,467 A | 2/1991 | Zimmerman |
| 7,452,867 B2 | 11/2008 | Gozes et al. |
| 7,960,334 B2 | 6/2011 | Gozes et al. |
| 8,143,221 B2 | 3/2012 | Gozes et al. |
| 8,377,875 B2 | 2/2013 | Gozes et al. |
| 8,586,548 B2 | 11/2013 | Gozes |
| 8,618,043 B2 | 12/2013 | Gozes et al. |
| 9,518,994 B2 | 12/2016 | Gozes et al. |
| 10,118,943 B2 | 11/2018 | Gozes et al. |
| 2007/0054847 A1 | 3/2007 | Gozes et al. |
| 2012/0010148 A1 | 1/2012 | Gozes et al. |
| 2015/0196501 A1 | 7/2015 | Erickson et al. |
| 2017/0095429 A1 | 4/2017 | Erickson et al. |
| 2018/0289637 A1 | 10/2018 | Laufer et al. |
| 2018/0344809 A1 | 12/2018 | Gozes |
| 2020/0297662 A1 | 9/2020 | Sermone et al. |

FOREIGN PATENT DOCUMENTS

| | | | |
|---|---|---|---|
| EP | 2521919 A2 | 11/2012 | |
| WO | WO-2010075635 A1 * | 7/2010 | .......... A61K 31/496 |
| WO | WO-2014117089 A1 | 7/2014 | |
| WO | WO-19/006161 A1 | 1/2019 | |
| WO | WO-2019053667 A1 * | 3/2019 | .......... A61K 31/165 |
| WO | WO-20/0198039 A1 | 10/2020 | |
| WO | WO-20/247615 A1 | 12/2020 | |

OTHER PUBLICATIONS

Malishkevich et. al., Transl. Psychiatry, vol. 5, p. e501 (1-9), publ. 2015 (Year: 2015).*
Yang et. al., J. Proteomics, vol. 75, pp. 3617-3629, publ. 2012 (Year: 2012).*
Hacohen-Kleiman, G., et al., "Atypical Auditory Brainstem Response and Protein Expression Aberrations Related to ASD and Hearing Loss in the Adnp Haploin sufficient Mouse Brain," Neurochemical Research, vol. 44, pp. 1494-1507 (published online Jan. 18, 2019: https://doi.org/10.1007/s11064-019-02723-6).
Pescosolido, M.F., et al., "Lighting a path: genetic studies pinpoint neurodevelopmental mechanisms in autism and related disorders," Dialogues in Clinical Neuroscience, vol. 14, No. 3, pp. 239-252 (2012).
Extended European Search Report issued Jun. 26, 2023 by European Patent Office in European Patent Application No. 20818166.9 (9 total pages).
Mandel, S., et al., "Activity-dependent neuroprotective protein (ADNP) differentially interacts with chromatin to regulate genes essential for embryogenesis," Developmental Biology, vol. 303, pp. 814-824 (2007).
Helsmoortel, C., et al., "A SWI/SNF related autism syndrome caused by de novo mutations in ADNP," Nat. Genet., vol. 46, No. 4, pp. 380-384, (Apr. 2014)—Author Manuscript available in PMC Oct. 1, 2014 (15 total pages).

(Continued)

*Primary Examiner* — Sarah Pihonak
(74) *Attorney, Agent, or Firm* — Wilmer Cutler Pickering Hale and Dorr LLP

(57) ABSTRACT

The invention is directed to a method of increasing the expression of Activity-Dependent Neuroprotector Protein (ADNP) in at least one mammalian cell showing insufficient ADNP expression levels, comprising administering to the at least one mammalian ceil an effective amount of ketamine or a combination of ketamine and ADNP-Derived Neuroprotective Peptide (NAP).

15 Claims, No Drawings

(56) References Cited

OTHER PUBLICATIONS

Arnett, A.B., et al., "The Autism Spectrum Phenotype in ADNP Syndrome," Austism Res., vol. 11, No. 9, pp. 1300-1310 (Sep. 2018)—Author Manuscript available in PMC Sep. 1, 2019 (22 total pages).

Zamostiano, R., et al., "Cloning and Characterization of the Human Activity-dependent Neuroprotective Protein," The Journal of Biological Chemistry, vol. 276, pp. 708-714, first published on Sep. 29, 2000, downloaded from https://www.jbc.org/content/276/1/708.long (9 total pages).

Gennet, N., et al., "Expression of activity-dependent neuroprotective protein in the brain of adult rats," Histology and Histopathology—Cellular and Molecular Biology, vol. 23, pp. 309-317 (2008).

Oz, S., et al., "The NAP motif of activity-dependent neuroprotective protein (ADNP) regulates dendritic spines through microtubule end binding proteins," Molecular Psychiatry, vol. 19, pp. 1115-1124 (2014).

Fava, M., et al., "Double-Blind, Placebo-Controlled, Dose-Ranging Trial of Intravenous Ketamine as Adjunctive Therapy in Treatment-Resistant Depression (TRD)," Mol. Psychiatry, Author Manuscript available in PMC Apr. 4, 2019 (20 total pages).

Spravato®, Highlights of Prescribing Information, Janssen Pharmaceutical Companies, New Jersey, U.S.A., 41 total pages issued by U.S. Food and Drug Administration (Mar. 2019).

Kurdi, M.S., et al., "Ketamine: Current applications in anesthesia, pain, and critical care," Anesth. Essays Res., vol. 8, No. 3, pp. 283-290 (Sep.-Dec. 2014)—downloaded from https://www.ncbi.nlm.nih.gov/pmc/articles/PMC4258981/, last retrieved on May 27, 2020, pp. 1-11.

Turner, C.P., et al., "Strategies to defeat ketamine-induced neonatal brain injury," Neuroscience, vol. 210, pp. 384-392 (May 17, 2012)—Author Manuscript available in PMC May 17, 2013 (18 total pages).

Brown, B.P., et al., "In Vivo and In Vitro Ketamine Exposure Exhibits a Dose-Dependent Induction of Activity-Dependent Neuroprotective Protein in Rat Neurons," Neuroscience, vol. 290, pp. 31-40 (available online Jan. 13, 2015).

Blaj, C., et al., "ADNP Is a Therapeutically Inducible Repressor of WNT Signaling in Colorectal Cancer," Clin. Cancer Res., vol. 23, No. 11, pp. 2769-2780 (first published online Nov. 30, 2016).

Vulih-Shultzman, I. et al., "Activity-Dependent Neuroprotective Protein Snippet NAP Reduces Tau Hyperphosphorylation and Enhances Learning in a Novel Transgenic Mouse Model," J. Pharmacol. Exp. Ther., vol. 323, No. 2, pp. 438-449, doi: 10.1124/jpet.107.129551 (accepted Aug. 23, 2007).

Amram, N., et al., "Sexual Divergence in Microtubule Function: The Novel Intranasal Microtubule Targeting SKIP Normalizes Axonal Transport and Enhances Memory," Mol. Psychiatry, vol. 21, pp. 1467-1476, doi: 10.1038/mp.2015.208 (published online Jan. 19, 2016).

Ivashko-Pachima, Y., et al., "ADNP/NAP Dramatically Increase Microtubule End-Binding protein-Tau Interaction: A Novel Avenue for Protection Against Tauopathy," Mol. Psychiatry, vol. 22, pp. 1335-1344, doi: 10.1038/mp.2016.255 (published online Jan. 24, 2017).

Chen, M.H., et al., "Antisuicidal Effect, BDNF Val66Met Polymorphism, and Low-Dose Ketamine Infusion: Reanalysis of Adjunctive Ketamine Study of Taiwanese Patients With Treatment-Resistant Depression (AKSTP-TRD)," J. Affect. Disord., vol. 251, pp. 162-169, doi: 10.1016/j.jad.2019.03.075, (available online Mar. 23, 2019).

Yan, J. and Jiang, H., "Dual Effects of Ketamine: Neurotoxicity Versus Neuroprotection in Anesthesia for the Developing Brain," Journal of Neurosurgical Anesthesiology, vol. 26, No. 2, pp. 155-160 (Apr. 2014).

Sragovich, S., et al., "The autism-mutated ADNP plays a key role in stress response," Translational Psychiatry, vol. 9, No. 235, pp. 1-12 (2019).

Kapitansky, O., "Single Cell ADNP Predictive of Human Muscle Disorders: Mouse Knockdown Results in Muscle Wasting," Cells, vol. 9, No. 2320, pp. 1-25 (Oct. 19, 2020).

Grigg, I., et al., "Tauopathy in the young autistic brain: novel biomarker and therapeutic target," Transl. Psychiatry, vol. 10, No. 228, 10 total pages (2020).

Ivashko-Pachima, Y., et al., "Deciphering the Enigma: Nap (CP201) the Active ADNP Drug Candidate Enters Cells by Dynamin-Associated Endocytosis,," J. Mol. Neurosci., vol. 70, pp. 993-998 (published online Jun. 26, 2020).

Heimesaat, M.M., et al., "Immune-modulatory Properties of the Octapeptide NAP in Campylobacter jejuni Infected Mice Suffering from Acute Enterocolitis," Microorganisms, vol. 8, No. 802, pp. 1-18 (May 26, 2020).

Kapitansky, O., et al., "Microbiota changes associated with ADNP deficiencies: rapid indicators for Nap (CP201) treatment of the ADNP syndrome and beyond," J. Neural. Transm., vol. 127, pp. 251-263 (published online Feb. 18, 2020).

Ivashko-Pachima, et al., "Discovery of autism/intellectual disability somatic mutations in Alzheimer's brains: mutated ADNP cytoskeletal impairments and repair as a case study," Molecular Psychiatry, 15 total pages (published online Oct. 30, 2019).

Levine, J., et al., "Developmental Phenotype of the Rare Case of DJ Caused by a Unique ADNP Gene De Novo Mutation," Journal of Molecular Neuroscience, vol. 68, pp. 321-330 (published online May 24, 2019).

Yang, M.H., et al., "Reduction of aluminum ion neurotoxicity through a small peptide application—NAP treatment of Alzheimer's disease," Food Drug Anal., vol. 27, pp. 551-564 (available online Jan. 12, 2019).

Ivashko-Pachima, Y., et al., "NAP (davunetide) preferential interaction with dynamic 3-repeat Tau explains differential protection in selected tauopathies," PLoS One, vol. 14, No. 3, e0213666, 20 total pages (Mar. 13, 2019).

Mollinedo, P, et al., "Cellular and animal models of skin alterations in the autism-related ADNP syndrome," Scientific Reports, vol. 9, No. 736, 10 total pages (published online Jan. 24, 2019).

Sragovich, et al., "The autism/neuroprotection-linked ADNP/NAP regulate the excitatory glutamatergic synapse," Translational Psychiatry, vol. 9, No. 2, pp. 1-14 (2019).

Gozes, I., "ADNP Regulates Cognition: A Multitasking Protein," Frontiers in Neuroscience, vol. 12, Article 873, pp. 1-5 (Nov. 2018).

Ivashko-Pachima, Y., et al., "NAP Protects against Tau Hyperphosphorylation Through GSK3," Curr. Pharm., vol. 24 accepted Nov. 5, 2018 (10 total pages).

Hacohen-Kleiman, G., et al., "Activity-dependent neuroprotective protein deficiency models synaptic and developmental phenotypes of autism-like syndrome," J. Clin. Invest., vol. 128, No. 11, pp. 4956-4969 (Nov. 2018).

Ziv, Y., "Activity-dependent neuroprotective protein (ADNP) is an alcohol-responsive gene and negative regulator of alcohol consumption in female mice," Neuropsychopharmacology, vol. 44, pp. 415-424 (published online Jun. 27, 2018).

Alm, A., and Villumsen, J., "Effects of Topically Applied PGF2alpha and its Isopropylester on Normal and Glaucomatous Human Eyes," The Ocular Effects of Prostaglandins, pp. 447-458 (1989).

Coe, B.P., et al., "Refining analyses of copy number variation identifies specific genes associated with developmental delay," Nature Genetics, vol. 46, No. 10, pp. 1063-1071—11 total pages with "Online Methods" (Oct. 2014).

Fitzgerald, T. W et. al., "Large-scale discovery of novel genetic causes of developmental disorders," Nature, vol. 519, No. 7542, pp. 223-228 (Mar. 12, 2015)—Author Manuscript available in PMC May 16, 2018 (27 total pages).

Genesis Behavior Center, "How Autism and Sensory Processing Disorder Are Linked", published online Aug. 2016, pp. 1-6, http: https: //genesisbehavi orcenter. com/how-autism-and-sensory-processing-disorder-are-l inked/ (Year: 2016).

International Search Report and Written Opinion prepared by U.S. Patent and Trademark Office as International Searching Authority for International Patent App. No. PCT/US2020/023947, mailed Jun. 16, 2020 (8 total pages).

(56) References Cited

OTHER PUBLICATIONS

International Search Report and Written Opinion prepared by U.S. Patent and Trademark Office as International Searching Authority for International Patent App. No. PCT/US2020/036103, mailed Oct. 9, 2020 (12 total pages).

Mordenti, J., et al., "Intraocular Pharmcokinetics and Safety of a Humanized Monoclonal Antibody in Rabbits after Intravitreal Administration of a Solution or a PLGA Microsphere Formulation," Toxicol. Sci., vol. 52, pp. 101-106 (1999).

Ostapcuk, V., et. al. , "Activity-dependent Neuroprotective Protein Recruits HP1 and CHD4 to Control Lineage-specifying Genes," Nature, vol. 557, pp. 739-743 with Methods and Reporting Summary (26 total pages), doi.org/10.1038/s41586-018-0153-8 (May 31, 2018).

Quraishe, S., et. al., "Microtubule stabilising peptides rescue tau phenotypes in-vivo," Scientific Reports, vol. 6, No. 38224, pp. 1-9 (Dec. 2, 2016) with Corrigenndum updated Feb. 1, 2017 (10 total pages).

Examination Report issued Jul. 16, 2025 by European Patent Office in European Patent Application No. 20818166.9 (9 total pages).

\* cited by examiner

KETAMINE AND KETAMINE/NAP FOR TREATMENT OF ADNP SYNDROME AND RELATED NEUROLOGICAL CONDITIONS

This application is a U.S. National Stage application under 35 U.S.C. § 371 of International Patent Application No. PCT/US2020/036103, filed on Jun. 4, 2020, which claims the benefit and priority of U.S. Application Ser. No. 62/857,210 filed Jun. 4, 2019, the contents of each of which are hereby incorporated by reference in their entireties.

This patent disclosure contains material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

All patents, patent applications and publications cited herein are hereby incorporated by reference in their entirety. These publications are incorporated by reference into this application in order to more fully describe the state of the art as known to those skilled therein as of the date of the invention described herein.

TECHNICAL FIELD

The present invention relates generally to pharmaceutical compositions and methods used to increase gene and/or protein expression. More specifically, the invention relates to administration of ketamine or a combination of ketamine and NAP to increase ADNP expression in a cell or mammal, including a human.

BACKGROUND

The present disclosure provides novel compositions and methods for administration to individuals with a condition related to insufficient ADNP expression, such as ADNP syndrome, autism, Alzheimer's, Schizophrenia, sensory processing disorder, or other related neurological conditions where ADNP expression is changed or affected. Sensory processing disorder can manifest as oversensitivity to sensory input, such as sound or touch, or an excessive or compulsive seeking of sensory input. Other pathology related to insufficient ADNP expression include neurological dysfunction, neurological degeneration, neurodevelopmental dysfunction, including intellectual delay, speech dysfunction, and motor disruption.

ADNP Syndrome

ADNP Syndrome (also known as Helsmoortel-Van Der Aa Syndrome/HVDAS) is a rare genetic condition that causes a wide spectrum of signs and symptoms. Its hallmark features are intellectual disability and autism spectrum disorder, characterized by impaired communication and social interaction. Affected individuals also have distinctive facial features and abnormalities of multiple body systems.

Individuals with ADNP syndrome have mild to severe intellectual disability and delayed development of speech and motor skills such as sitting and walking. They demonstrate many features typical for autism spectrum disorder, including, for example, repetitive behaviors and social interaction difficulties. ADNP syndrome is also associated with mood disorders or behavioral problems, such as anxiety, temper tantrums, attention-deficit/hyperactivity disorder (ADHD), obsessive-compulsive disorder (OCD), as well as sleep abnormalities.

Many individuals with ADNP syndrome have distinctive facial features, which often include a prominent forehead, a high hairline, outside corners of the eyes that point upward or downward (up slanting or down slanting palpebral fissures), ptosis, a broad nasal bridge, and a thin upper lip. These individuals may also have unusually shaped ears and/or hand and finger abnormalities. Eye and vision abnormalities, such as strabismus and hyperopia, also occur in ADNP syndrome. Some individuals with ADNP syndrome have early eruption of primary teeth.

ADNP syndrome may also cause hypotonia and feeding difficulties in infancy. Some patients develop digestive system problems, such as gastroesophageal reflux, vomiting, and constipation. Other ADNP features include obesity, seizures, and heart abnormalities.

ADNP Gene

ADNP syndrome is caused by mutations in the ADNP (Activity-Dependent Neuroprotector Protein) gene. The ADNP gene is located on the long arm of chromosome 20 (20q13.13). The ADNP protein (also known as Activity-Dependent Neuroprotector Homeobox) encoded by the ADNP gene, is a homeodomain-containing zinc finger protein with transcription factor activity. It participates in the regulation of the activity and expression of other genes through chromatin remodeling and is thereby involved in many aspects of growth and development.

ADNP is particularly important for brain formation and normal brain development. Experimental data demonstrated that downregulation of ADNP by antisense oligonucleotides upregulated p53 and reduced the viability of intestinal cancer cells by 90%. It has been proposed that ADNP is involved in maintaining cell survival, possibly by modulating p53.

The ADNP protein was found to interact with proteins BRG1 (SMARCA4), BAF250A (ARID1A), and BAF170 (SMARCC2), all of which are components of the SWI/SNF chromatin remodeling complex. Domain analysis showed that the C-terminal domain of ADNP was required for its interaction with SWI/SNF proteins. Short hairpin RNAs that knocked down ADNP expression to 80%, but not to 50%, resulted in microtubule reorganization and changes in cell morphology, with reduced formation of cell processes and reduced cell number.

The ADNP protein was also shown to interact with the chromatin remodeler CHD4 and the chromatin architectural protein HP1 to form a stable complex, referred to as ChAHP. Besides mediating complex assembly, ADNP recognizes DNA motifs that specify binding of ChAHP to euchromatin. Genetic ablation of ChAHP components in mouse embryonic stem cells resulted in spontaneous differentiation concomitant with premature activation of lineage-specific genes and in a failure to differentiate towards the neuronal lineage. The mechanism of ChAHP-mediated silencing is suggested to differ from canonical HP1-mediated silencing.

ADNP Syndrome Pathology

Initially, via whole-exome sequencing, Helsmoortel, et al., (2014) identified 9 different de novo heterozygous truncating mutations in the ADNP gene in 10 unrelated Helsmoortel-Van der Aa syndrome patients. See Helsmoortel, C., et al., *A SWI/SNF-related Autism Syndrome Caused by De Novo Mutations in ADNP*. Nature Genetics, Vol. 46, no. 4 (April 2014), pp. 380-384. All mutations occurred at the 3-prime end of the last exon of the ADNP gene and can result in the loss of at least the last 166 C-terminal residues of the ADNP protein, leading to its escape from nonsense-mediated mRNA decay. Helsmoortel noted that mutations in other SWI/SNF components of the BAF complex, such as SMARCB1 and ARID1B, have been identified in patients with intellectual disability, and hypothesized that the ADNP mutations cause a dominant-negative effect on the recruitment of the BAF complex, resulting in deregulation of gene expression and a disruption of neuronal processes. ADNP mutations can lead to lower levels of ADNP protein expression.

In 4 patients with intellectual disability and varying syndromic features, the Deciphering Developmental Disorders Study (2015) identified 3 de novo heterozygous mutations in the ADNP gene. See Fitzgerald, T. W., et al., *Large-scale Discovery of Novel Genetic Causes of Developmental Disorders. Nature*, Vol. 519, no. 7542 (March 2015), pp. 223-228.

The suspected general role of the ChAHP complex in governing cell fate plasticity may explain why ADNP mutations affect several organs and body functions and contribute to cancer progression. Ostapcuk, et al., (2018) found that the integrity of the ChAHP complex is disrupted by nonsense mutations identified in patients with ADNP syndrome, and this could be rescued by aminoglycosides that suppress translation termination. See Ostapcuk, V., et al., *Activity-dependent Neuroprotective Protein Recruits HP1 and CHD4 to Control Lineage-specifying Genes. Nature*, Vol. 557, no. 7707 (May 2018), pp. 739-743.

Conditions with similar pathology include any neurological conditions coinciding with changes or alterations in ADNP gene or protein expression. A syndrome with similar pathology and symptoms may also be caused by mutations in the Forkhead Box Protein P1 (FOXP1) gene, called FOXP1 syndrome.

Autism Spectrum Disorder

Autism spectrum disorder (ASD) is a neurodevelopmental disorder characterized by impairments in social communication as well as restricted and repetitive interests and behaviors. Within these broad symptom domains, the behavioral profiles of individuals with ASD are extremely heterogeneous. In recent years, disruptive gene mutations involving several hundred different genes have been identified as putative causes of ASD, yet they account for only 30% of ASD cases altogether. The ADNP gene is one of the most commonly affected single genes in ASD. The ADNP gene is also related to other neurological conditions such as Alzheimer's Disease and Schizophrenia.

Ketamine

Ketamine is a dissociative anesthetic. It is a non-competitive N-methyl-D-aspartate (NMDA) receptor antagonist that disrupts calcium homeostasis in neurons providing a neuronal stressor. It can be a neurotoxin in some animal models as well as a neuroprotectant in other animal models, and depending on the dose, it has been demonstrated to be protective as well as destructive to certain brain regions.

It has been observed that anesthetic doses of ketamine induce gene expression of ADNP in rats. Turner et al. (2012) observed using microarray analysis that ADNP gene expression increases significantly in the somatosensory cortex of post-natal day 7 rats following an anesthetic dose of ketamine (20 mg/kg). See Turner, C. P., et al., *Strategies to Defeat Ketamine-induced Neonatal Brain Injury. Neuroscience*, Vol. 210 (May 17, 2012), pp. 384-392. However, a major issue with anesthetic doses of ketamine is the potential for neurotoxic effects including induction of apoptosis. The Turner study found that anesthetic doses of ketamine increased levels of pro-apoptotic enzyme activated caspase-3 (AC3) which is a marker for apoptotic cell death.

Ketamine is on the World Health Organization's List of Essential Medicines for Children up to 12 years of age. Recent clinical evidence suggests that the use of general anesthetics on young children can promote learning deficits as they mature. This is may be due to ketamine's role in increasing apoptosis.

Administration of a specific sub-anesthetic dose of ketamine, which is less likely to have such neurotoxic effects, has been observed to induce ADNP expression as well, including in the somatosensory cortex. Brown et al. (2015) investigated the effect on ADNP of a 5 mg/kg ketamine dose. See Brown, B. P., et al., *In Vivo and In Vitro Ketamine Exposure Exhibits a Dose-dependent Induction of Activity-dependent Neuroprotective Protein in Rat Neurons. Neuroscience*. Vol. 290 (Apr. 2, 2015), pp. 31-40. Brown et al. found that the 5 mg/kg dose of ketamine administration increased ADNP in the Fasciola Cinereum (FC) and SSC layers II/III.

NAP

NAP is a small octapeptide derived from the ADNP protein known to have stabilizing effects on the microtubule cytoskeleton of neurons. See Quraishe S, et al. Scientific Reports. 2016; 6: 38224. Turner et al. showed that NAP had a protective effect against ketamine-induced apoptosis in the somatosensory cortex. See Turner, C. P., et al., *Strategies to Defeat Ketamine-induced Neonatal Brain Injury. Neuroscience*. Vol. 210 (May 17, 2012), pp. 384-392. The authors of the study demonstrated a dose-dependent reduction of ketamine-induced apoptosis in P7 rat pup brain by the combination of anesthetic doses of ketamine (20 mg/kg) co-administered with NAP (5-20 mg/kg). The 10 mg/kg and 20 mg/kg NAP doses were effective at reducing the ketamine-induced apoptosis (20 mg/kg ketamine).

SUMMARY

In one aspect, the invention provides for a method of increasing the expression of Activity-Dependent Neuroprotector Protein (ADNP) in at least one mammalian cell showing insufficient ADNP expression levels, including administering to the at least one mammalian cell an effective amount of a combination of ketamine and ADNP-Derived Neuroprotective Peptide (NAP).

In some embodiments, the ketamine and NAP are administered to a mammal in need of treatment for a condition related to the insufficient ADNP expression. In some embodiments, the insufficient expression is related to insufficient expression of one or more genes selected from the group consisting of the ADNP gene and the Forkhead Box Protein P1 (FOXP1) gene. In some embodiments, the insufficient expression is related to genetic alterations of one or more genes, including for example, the ADNP gene and the FOXP1 gene. In some embodiments, the genetic alterations include germ line or somatic mutations of one or more genes, including for example, the ADNP gene and the FOXP1 gene. In some embodiments, the genetic alterations include copy number variations of one or more genes, including for example, the ADNP gene and the FOXP1 gene. In some embodiments, the insufficient expression is related to insufficient expression of the Activity-Dependent Neuroprotector Homeobox protein.

In some embodiments, the mammal in need of treatment for a condition related to the insufficient ADNP expression displays one or more symptoms, including for example, neurodevelopmental dysfunction, intellectual impairment, abnormal sensory processing, delayed speech and language development, neurological speech impairment, motor dysfunction, impaired social interactions, urinary incontinence, and abnormal temper tantrums. In some embodiments, the condition related to the insufficient ADNP expression is Autism Spectrum Disorder (ASD). In some embodiments, the condition related to the insufficient ADNP expression is ADNP Syndrome. In some embodiments, the condition is Alzheimer's Disease. In some embodiments, the condition is Schizophrenia. In some embodiments, the condition related to the insufficient ADNP expression includes neurological degeneration.

In some embodiments, ketamine and NAP are used as reagents to increase ADNP expression in at least one mammalian cell showing insufficient ADNP expression levels for laboratory research. In some embodiments, ketamine and NAP are administered in vitro. In some embodiments, ketamine and NAP are administered in vivo. In some embodiments, the method includes administering another pharmaceutically active agent. In some embodiments, ketamine and NAP are administered in at least one pharmaceutical composition. In some embodiments, the mammalian cell is a human cell. In some embodiments, the mammal is a human.

In some embodiments, ketamine and NAP are administered orally, topically, or parenterally. In some embodiments, ketamine and NAP are administered intramuscularly, subcutaneously, or intravenously. In some embodiments, ketamine and NAP are administered sublingually, transmucosally, or intranasally. In some embodiments, ketamine and NAP are administered in an aerosolized form. In some embodiments, ketamine and NAP are administered within about 30 minutes or less of each other. In some embodiments, ketamine and NAP are co-administered in a single pharmaceutical composition. In some embodiments, ketamine and NAP are administered according to a schedule. In some embodiments, ketamine and NAP are administered one or more times daily. In some embodiments, ketamine and NAP are administered one or more times weekly. In some embodiments, ketamine and NAP are administered as needed. In some embodiments, each dose of ketamine is in the sub-anesthetic range. In some embodiments, each dose of ketamine corresponds to an amount more than about 0.01 mg/kg and less than about 10 mg/kg. In some embodiments, each dose of ketamine corresponds to the amount of about 5.0 mg/kg. In some embodiments, each dose of ketamine corresponds to the amount of about 0.5 mg/kg. In some embodiments, each dose of NAP corresponds to an amount of more than about 0.01 mg/kg and less than about 5 mg/kg. In some embodiments, each dose of NAP corresponds to the amount more than about 0.1 mg/kg and less than about 1 mg/kg. In some embodiments, the combination of ketamine and NAP increases ADNP levels while preventing ketamine-induced neurotoxic effects.

In another aspect, the invention provides for a method of increasing the expression of Activity-Dependent Neuroprotector Protein (ADNP) in at least one mammalian cell showing insufficient ADNP expression levels, including administering to the at least one mammalian cell an effective amount of ketamine.

In some embodiments, the ketamine is administered to a mammal in need of treatment for a condition related to the insufficient ADNP expression. In some embodiments, the insufficient expression is related to insufficient expression of one or more genes selected from the group consisting of the ADNP gene and the Forkhead Box Protein P1 (FOXP1) gene. In some embodiments, the insufficient expression is related to genetic alterations of one or more genes, including for example, the ADNP gene and the FOXP1 gene. In some embodiments, the genetic alterations include germ line or somatic mutations of one or more genes, including for example, the ADNP gene and the FOXP1 gene. In some embodiments, the genetic alterations include copy number variations of one or more genes, including for example, the ADNP gene and the FOXP1 gene. In some embodiments, the insufficient expression is related to insufficient expression of the Activity-Dependent Neuroprotector Homeobox protein.

In some embodiments, the mammal in need of treatment for a condition related to the insufficient ADNP expression displays one or more symptoms, including for example, neurodevelopmental dysfunction, intellectual impairment, abnormal sensory processing, delayed speech and language development, neurological speech impairment, motor dysfunction, impaired social interactions, urinary incontinence, and abnormal temper tantrums. In some embodiments, the condition related to the insufficient ADNP expression is Autism Spectrum Disorder (ASD). In some embodiments, the condition related to the insufficient ADNP expression is ADNP Syndrome. In some embodiments, the condition is Alzheimer's Disease. In some embodiments, the condition is Schizophrenia. In some embodiments, the condition related to the insufficient ADNP expression includes neurological degeneration.

In some embodiments, ketamine is used as a reagent to increase ADNP expression in at least one mammalian cell showing insufficient ADNP expression levels for laboratory research. In some embodiments, ketamine is administered in vitro. In some embodiments, ketamine is administered in vivo. In some embodiments, the method includes administering another pharmaceutically active agent. In some embodiments, the mammalian cell is a human cell. In some embodiments, the mammal is a human.

In some embodiments, ketamine is administered orally, topically, or parenterally. In some embodiments, ketamine is administered intramuscularly, subcutaneously, or intravenously. In some embodiments, ketamine is administered sublingually, transmucosally, or intranasally. In some embodiments, ketamine is administered in an aerosolized form. In some embodiments, ketamine is administered according to a schedule. In some embodiments, ketamine is administered one or more times daily. In some embodiments, ketamine is administered one or more times weekly. In some embodiments, ketamine is administered as needed. In some embodiments, each dose of ketamine is in the sub-anesthetic range. In some embodiments, each dose of ketamine corresponds to an amount more than about 0.01 mg/kg and less than about 10 mg/kg. In some embodiments, each dose of ketamine corresponds to an amount of about 5.0 mg/kg. In some embodiments, each dose of ketamine corresponds to the amount of about 0.5 mg/kg.

Definitions

As used herein, "about" means an approximate amount, with the degree of approximation based on the context in which the word is used, and the number being modified. With respect to doses. "about" includes values with ±5% variation. For example, "about 5 mg/kg" includes values higher and lower than 5 mg/kg within a range of ±5%.

As used herein, "ADNP expression" means ADNP gene expression and/or ADNP protein expression.

As used herein, "mammal" means a warm-blooded vertebrate animal. Mammal includes, without limitation, mice: rats; rabbits; guinea pigs: dogs; cats; sheep; goats; cows; horses; primates, such as monkeys, chimpanzees, and apes, and, humans.

As used herein, "administration" or "administering" means delivering a dose of a pharmaceutically active ingredient in vitro or in vivo. This includes delivering a dose to a cell or to a whole organism, including a mammal, such as, for example, a human.

As used herein, a "dose" means an amount of therapeutic agent administered to a cell, organism, or mammal, including a human patient.

As used herein, a "daily dose" means the total amount of therapeutic agent administered to a cell, mammal, or human patient in a day.

As used herein, the term "therapeutic agent" means a substance that is effective in the amelioration and/or treatment of a disease, condition, abnormality, or deficiency. A therapeutic agent may be used to effectively upregulate gene and/or protein expression levels in a cell or mammal, including a human.

As used herein, "effective amount," "therapeutically effective amount," or "pharmaceutically effective amount" means an amount of therapeutic agent that has a therapeutic effect. The doses of a pharmaceutically active ingredient that are useful in amelioration and/or treatment are therapeutically effective amounts. Thus, as used herein, an effective amount means those amounts of therapeutic agent that produce the desired therapeutic effect as judged by clinical trial results and/or model studies, including in vivo and/or in vitro studies. This includes amounts of a therapeutic agent which improve or ameliorate abnormal levels of gene and/or protein expression in a cell.

As used herein, "therapeutic effect" means a relief, to some extent, of one or more of the symptoms of a disease or disorder. For example, a therapeutic effect may be observed by a reduction of the subjective discomfort that is communicated by a subject (e.g., reduced discomfort noted in self-administered patient questionnaire). Therapeutic effect may also be observed through objective criteria such as, for example, a reduction in motor or speech deficits.

The term "carrier" or "excipient" means any substance, not itself a therapeutic agent, used as a diluent and/or adjuvant and/or vehicle for delivery of a therapeutic agent to a subject and/or a substance added to a composition to improve its handling or storage properties and/or a substance added to permit or facilitate formation of a dose unit of the composition into a discrete article such as a capsule, tablet, film coated tablet, caplet, gel cap, pill, pellet, bead, and the like suitable for oral administration.

The term "physiologically acceptable" means a carrier or excipient does not abrogate the biological activity and properties of the compound to be taken up by cells/tissues (e.g., the active compound).

DETAILED DESCRIPTION

The present disclosure is directed to compositions and methods of administering ketamine or a combination of ketamine and NAP to enhance ADNP expression in a cell, animal, mammal, or human patient with insufficient ADNP expression levels. The disclosure is also directed to administering ketamine or ketamine and NAP to a mammal in need of treatment for a condition caused by insufficient ADNP expression, including, in humans, ASD and ADNP Syndrome.

In the study by Brown, et al., a specific sub-anesthetic dose of ketamine (5 mg/kg) was shown to increase ADNP expression in healthy rats which did not have mutations in the ADNP gene or otherwise show insufficient ADNP transcript or protein expression levels. See Brown, B. P., et al., *In Vivo and In Vitro Ketamine Exposure Exhibits a Dose-dependent Induction of Activity-dependent Neuroprotective Protein in Rat Neurons. Neuroscience*, Vol. 290 (Apr. 2, 2015), pp. 31-40. Turner et al. showed that administration of NAP had a protective effect against ketamine-induced apoptosis in the somatosensory cortex of rat pups. See Turner, C. P., et al., *Strategies to Defeat Ketamine-induced Neonatal Brain Injury. Neuroscience*. Vol. 210 (May 17, 2012), pp. 384-392. As with the Brown study (above), the rat pups in the Turner study did not have ADNP mutations or any baseline level reductions in ADNP protein and/or gene expression levels. Therefore, there remains a need for methods of increasing ADNP expression in cells and mammals that show insufficient gene and/or protein expression of ADNP or methods for increasing ADNP expression in cells and mammals with ADNP mutations. There is also a need for compositions and methods for increasing ADNP expression to treat ADNP syndrome and/or ASD.

While not intending to be bound by any theory, ketamine administration will cause upregulation of ADNP expression while NAP administrations will also cause upregulation of ADNP expression while preventing ketamine-induced neurotoxicity, such as apoptosis. NAP mimics some effects of the ADNP protein. It acts at multiple sites where the ADNP protein acts, including gene expression and enhancing the ADNP-EB3 interaction to improve synaptic plasticity. It is possible that NAP will reduce the potential for ketamine-induced damage by enhancing the invasion of dynamic microtubules into growth cones. In such circumstances the growth cones may not collapse in the presence of low concentrations of ketamine because of the potential microtubule stabilization promoting ability of the NAP. In some embodiments, by both increasing the amount of ADNP protein using ketamine and allowing the ADNP protein to function more effectively by administering NAP, the combination will be more efficacious than either alone.

The somatosensory cortex has a significant role in the sensory system in the human body, including a role in sensory processing. Individuals with an ADNP mutation who exhibit abnormal sensory behaviors due to autism and/or a sensory processing disorder, may have reduced levels of ADNP protein in the somatosensory cortices. In some embodiments, a human (including an infant or child) displays one or more symptoms such as neurodevelopmental dysfunction, intellectual impairment, abnormal sensory processing, delayed speech and language development, neurological speech impairment, motor dysfunction, impaired social interactions, urinary incontinence, and abnormal temper tantrums. Individuals with abnormal ADNP expression levels may also display sensation-seeking or sensation-avoiding behaviors. An increase in ADNP protein levels in the somatosensory cortex could cause or be associated with amelioration of sensory processing disorders and/or the symptoms associated with sensory and motor processing disorders. The administrations of ketamine or a ketamine and NAP combination therapy can ameliorate or reverse one or more of the above-mentioned neurological signs and symptoms.

Ketamine

Aspects of the invention include a method of increasing the expression of Activity-Dependent Neuroprotector Protein (ADNP) in at least one mammalian cell showing insufficient ADNP expression levels. The method includes administering to at least one mammalian cell an effective amount of ketamine.

In some embodiments, ketamine is administered to a mammal in need of treatment for a condition related to the insufficient ADNP expression. In some embodiments, the insufficient expression is related to insufficient expression of the ADNP gene and/or the Forkhead Box Protein P1 (FOXP1) gene. In some embodiments, ketamine increases ADNP protein expression in a cell or mammal exhibiting mutations in the FOXP1 gene. In some embodiments, ketamine is used to treat or ameliorate symptoms associated with FOXP1 Syndrome.

In some embodiments, the insufficient ADNP expression is related to genetic alterations of the ADNP gene and/or the FOXP1 gene. In some embodiments, the genetic alterations include germ line or somatic mutations of the ADNP gene and/or the FOXP1 gene. In some embodiments, the genetic alterations include copy number variations of the ADNP gene and/or the FOXP1 gene.

In some embodiments, the insufficient ADNP expression is related to insufficient expression of the Activity-Dependent Neuroprotector Homeobox protein (ADNP protein). In some embodiments, the cell or mammal, including a human patient, displays insufficient levels of ADNP gene or protein expression without detectable mutations in either the ADNP or FOXP1 genes. In such embodiments, the disclosed method of increasing ADNP gene or protein expression levels by administering ketamine can be used in the case of a cell, mammal, or human lacking such mutations.

In some embodiments, a mammal including a human, displays one or more symptoms such as for example neurodevelopmental dysfunction, intellectual impairment, abnormal sensory processing, delayed speech and language development, neurological speech impairment, motor dysfunction, impaired social interactions, urinary incontinence, and abnormal temper tantrums. In some embodiments, a mammal, such as a human, requires treatment for Autism Spectrum Disorder (ASD) or ADNP Syndrome. In some embodiments, a mammal, such as a human, requires treatment for Alzheimer's or Schizophrenia. In some embodiments, a mammal, such as a human, displays neurological degeneration.

In some embodiments, ketamine is administered in vitro, meaning outside of a living organism. In vitro administration includes administering ketamine to cultured cells. In some embodiments, ketamine is used as a reagent to increase ADNP expression for laboratory research instead of being used to treat a condition.

In some embodiments, ketamine is administered in vivo, meaning administered to a living mammal, including a human. In vivo administration includes all routes of administration known in the art including oral, topical, and parenteral. In some embodiments, ketamine is administered intramuscularly, subcutaneously, or intravenously. In some embodiments, ketamine is administered sublingually, transmucosally, or intranasally. In some embodiments, ketamine is administered in an aerosolized form. In some embodiments, the pharmaceutical composition for ketamine includes ketamine, saline, and chlorobutanol.

In some embodiments, ketamine as disclosed and described herein can be used in combination therapy with at least one other agent. In some embodiments, the at least one other agent used in combination therapy is NAP. In some embodiments, the at least one other agent used in combination therapy is a small peptide molecule mimicking the function of the ADNP protein such as, for example, activity-dependent neurotropic factor-9 (ADNF-9). In some embodiments, the ketamine disclosed herein is administered concurrently with the administration of another agent, which may be part of the same composition as the compound of the present invention or a different composition. In other embodiments, the ketamine of the present invention is administered prior or subsequent to administration of another agent.

In some embodiments, ketamine may be administered according to a schedule. The schedule may include, for example, once daily, twice daily, or three times daily. The schedule can also include weekly administration such as once per week, twice per week, three times per week, four times per week, five times a week, or six times a week. The schedule can include administration, for example, every other day, every two days, every three days, every four days, every five days, or every six days. The administration schedule may also combine daily and weekly dose schedules such as for example, twice daily for two days in a given week. In addition, or in the alternative, to a schedule, ketamine can be administered as needed to achieve a therapeutic effect or target level of ADNP expression increase.

In some embodiments, the dose of ketamine may be, for example, less than about 5 mg/kg, less than about 4 mg/kg, less than about 3 mg/kg, less than about 2 mg/kg or less than about 1 mg/kg. In some embodiments, the dose of ketamine may be, for example, less than about 0.7 mg/kg, less than about 0.5 mg/kg, less than about 0.3 mg/kg, or less than about 0.1 mg/kg. In some embodiments, the dose of ketamine may be, for example, more than about 0.1 mg/kg, more than about 0.2 mg/kg, more than about 0.3 mg/kg, more than about 0.4 mg/kg, or more than about 0.5 mg/kg. In some embodiments, the dose of ketamine may be, for example, more than about 5 mg/kg, more than about 6 mg/kg, more than about 7 mg/kg, more than about 8 mg/kg, more than about 9 mg/kg, or more than about 10 mg/kg. In some embodiments, the dose of ketamine may be, for example, less than about 20 mg/kg, less than about 18 mg/kg, less than about 16 mg/kg, less than about 14 mg/kg, less than about 12 mg/kg, or less than about 10 mg/kg. In some embodiments, ketamine is administered at a sub-anesthetic dose such as about 0.5 mg/kg or less. A sub-anesthetic dose of ketamine may be preferable for deceasing or eliminating neurotoxic effects (e.g., apoptosis) while nevertheless enhancing ADNP expression to therapeutic levels.

Ketamine and NAP

The inventor has invented a method of increasing the expression of Activity-Dependent Neuroprotector Protein (ADNP) in at least one mammalian cell showing insufficient ADNP expression levels. The method includes administering to at least one mammalian cell an effective amount of a combination of ketamine and ADNP-Derived Neuroprotective Peptide (NAP).

In some embodiments, ketamine and NAP are administered to a mammal in need of treatment for a condition related to the insufficient ADNP expression. In some embodiments, the insufficient expression is related to insufficient expression of the ADNP gene and/or the Forkhead Box Protein P1 (FOXP1) gene. In some embodiments, a combination of ketamine and NAP increases ADNP protein expression in a cell or animal exhibiting mutations in the FOXP1 gene. In some embodiments, a combination of ketamine and NAP is used to treat or ameliorate symptoms associated with FOXP1 Syndrome.

In some embodiments, the insufficient ADNP expression is related to genetic alterations of the ADNP gene and/or the FOXP1 gene. In some embodiments, the genetic alterations include germ line or somatic mutations of the ADNP gene and/or the FOXP1 gene. In some embodiments, the genetic alterations include copy number variations of the ADNP gene and/or the FOXP1 gene.

In some embodiments, the insufficient ADNP expression is related to insufficient expression of the Activity-Dependent Neuroprotector Homeobox protein (ADNP protein). In some embodiments, the cell or mammal, including a human patient, displays insufficient levels of ADNP gene or protein expression without detectable mutations in either the ADNP or FOXP1 genes. In such embodiments, the disclosed method of increasing ADNP gene or protein expression levels by administering a combination of ketamine and NAP can be used in the case of a cell, mammal, or human lacking such mutations.

In some embodiments, a mammal including a human, displays one or more symptoms such as for example neurodevelopmental dysfunction, intellectual impairment, abnormal sensory processing, delayed speech and language development, neurological speech impairment, motor dysfunction, impaired social interactions, urinary incontinence, and abnormal temper tantrums. In some embodiments, a mammal, such as a human, requires treatment for Autism Spectrum Disorder (ASD) or ADNP Syndrome. In some embodiments, a mammal, such as a human, requires treatment for Alzheimer's or Schizophrenia. In some embodiments, a mammal, such as a human, displays neurological degeneration.

In some embodiments, ketamine and NAP are administered in vitro, meaning outside of a living organism. In vitro administration includes administering ketamine and NAP to cultured cells. In some embodiments, ketamine and NAP are used as reagents to increase ADNP expression for laboratory research instead of being used to treat a condition.

In some embodiments, ketamine and NAP are administered in vivo, meaning administered to a living mammal, including a human. In vivo administration includes all routes of administration known in the art including oral, topical, and parenteral. In some embodiments, ketamine and NAP are administered intramuscularly, subcutaneously, or intravenously. In some embodiments, ketamine and NAP are administered sublingually, transmucosally, or intranasally. In some embodiments, ketamine and NAP are administered in an aerosolized form. In some embodiments, ketamine is administered in one form, while NAP is administered in a different form. In some embodiments, ketamine is administered intranasally, while NAP is administered subcutaneously.

In some embodiments, the ketamine and NAP combination as disclosed and described herein can be used in combination therapy with at least one other agent. In some embodiments, the at least one other agent used in combination therapy is a small peptide molecule mimicking the function of the ADNP protein such as, for example, activity-dependent neurotropic factor-9 (ADNF-9). In some embodiments, the ketamine and NAP combination disclosed herein is administered concurrently with the administration of another agent, which may be part of the same composition as the compound of the present invention or a different composition. In other embodiments, a ketamine and NAP composition of the present invention is administered prior or subsequent to administration of another agent.

In some embodiments, ketamine and NAP are co-administered in one pharmaceutical composition. In some embodiments, ketamine and NAP are administered in separate pharmaceutical compositions at the same time. In some embodiments, the pharmaceutical composition for ketamine includes ketamine, saline, and chlorobutanol. In some embodiments, the pharmaceutical composition for NAP includes NAP, saline, and chlorobutanol. In some embodiments the co-administered pharmaceutical composition includes ketamine, NAP, saline, and chlorobutanol.

In some embodiments, ketamine and NAP are administered in separate pharmaceutical compositions within a certain amount of time. For example, ketamine and NAP may be administered within less than 1 minute of each other, between 1 and 30 minutes of each other, between 30 minutes and 1 hour of each other, and between 1 hour and 1.5 hours of each other. In some embodiments, ketamine and NAP are administered within 30 minutes of each other. In some embodiments, ketamine and NAP are administered within 24 hours of each other. In some embodiments, ketamine and NAP are administered within 48 hours of each other.

In some embodiments, ketamine and NAP may be administered according to a schedule. The schedule may include, for example, once daily, twice daily, or three times daily. The schedule can also include weekly administration such as once per week, twice per week, three times per week, four times per week, five times a week, or six times a week. The schedule can include administration, for example, every other day, every two days, every three days, every four days, every five days, or every six days. The administration schedule may also combine daily and weekly dose schedules such as for example, twice daily for two days in a given week. In addition, or in the alternative, to a schedule, ketamine and NAP can be administered as needed to achieve a therapeutic effect or target level of ADNP expression increase.

In some embodiments, the dose of ketamine may be, for example, less than about 5 mg/kg, less than about 4 mg/kg, less than about 3 mg/kg, less than about 2 mg/kg or less than about 1 mg/kg. In some embodiments, the dose of ketamine may be, for example, less than about 0.7 mg/kg, less than about 0.5 mg/kg, less than about 0.3 mg/kg, or less than about 0.1 mg/kg. In some embodiments, the dose of ketamine may be, for example, more than about 0.1 mg/kg, more than about 0.2 mg/kg, more than about 0.3 mg/kg, more than about 0.4 mg/kg, or more than about 0.5 mg/kg. In some embodiments, the dose of ketamine may be, for example, more than about 5 mg/kg, more than about 6 mg/kg, more than about 7 mg/kg, more than about 8 mg/kg, more than about 9 mg/kg, or more than about 10 mg/kg. In some embodiments, the dose of ketamine may be, for example, less than about 20 mg/kg, less than about 18 mg/kg, less than about 16 mg/kg, less than about 14 mg/kg, less than about 12 mg/kg, or less than about 10 mg/kg. In some embodiments, ketamine is administered at a sub-anesthetic dose such as about 0.5 mg/kg or less. A sub-anesthetic dose of ketamine may be preferable for deceasing or eliminating neurotoxic effects (e.g., apoptosis) while nevertheless enhancing ADNP expression to therapeutic levels. The administration of NAP can additionally decrease or eliminate the neurotoxic effects of ketamine. In some embodiments, NAP can be administered with anesthetic doses of ketamine (e.g., 20 mg/kg) resulting in decreased or eliminated ketamine-induced neurotoxic effects.

In some embodiments, the dose of NAP may be, for example, less than about 1 mg/kg, less than about 0.5 mg/kg, less than about 0.1 mg/kg, less than about 0.01 mg/kg, or less than about 0.001 mg/kg. In some embodiments, the dose of NAP may be, for example, more than about 0.001 mg/kg, more than about 0.01 mg/kg, more than about 0.1 mg/kg, more than about 0.5 mg/kg, or more than about 1 mg/kg. In some embodiments, the dose of NAP may be, for example, less than about 5 mg/kg, less than about 4 mg/kg, less than about 3 mg/kg, less than about 2 mg/kg or less than about 1 mg/kg. In some embodiments, the dose of NAP may be, for example, more than about 1 mg/kg, more than about 2 mg/kg, more than about 3 mg/kg, more than about 4 mg/kg, or more than about 5 mg/kg. In some embodiments, the dose of NAP may be, for example, more than about 6 mg/kg, more than about 7 mg/kg, more than about 8 mg/kg, more than about 9 mg/kg, or more than about 10 mg/kg. In some embodiments, the dose of NAP may be, for example, less than about 20 mg/kg, less than about 18 mg/kg, less than about 16 mg/kg, less than about 14 mg/kg, less than about 12 mg/kg, or less than about 10 mg/kg.

Routes and Methods of Administration

The compound(s) or combination of compounds disclosed herein, or pharmaceutical compositions may be administered to a cell, mammal, or human by any suitable means. Non-limiting examples of methods of administration include, among others, (a) administration though oral pathways, which includes administration in capsule, tablet, granule, spray, syrup, or other such forms; (b) administration through non-oral pathways such as intraocular, intranasal, intraauricular, rectal, vaginal, intraurethral, transmucosal, buccal, or transdermal, which includes administration as an aqueous suspension, an oily preparation or the like or as a drip, spray, suppository, salve, ointment or the like: (c) administration via injection, including subcutaneously, intraperitoneally, intravenously, intramuscularly, intradermally, intraorbitally, intracapsularly, intraspinally, intrasternally, or the like, including infusion pump delivery; (d) administration locally such as by injection directly in the renal or cardiac area, e.g., by depot implantation; (e) administration topically; as deemed appropriate by those of skill in the art for bringing the compound or combination of compounds disclosed herein into contact with living tissue; (f) administration via inhalation, including through aerosolized, nebulized, and powdered formulations; and (g) administration through implantation.

Pharmaceutical compositions suitable for administration include compositions where the compound(s) or combination of compounds disclosed herein is contained in an amount effective to achieve its intended purpose, discussed previously. The therapeutically effective amount of the compound or combination of compounds disclosed herein required as a dose will depend on the route of administration, the type of mammal, including human, being treated, and the physical characteristics of the specific mammal under consideration. The dose can be tailored to achieve a desired effect, but will depend on such factors as weight, diet, concurrent medication and other factors which those skilled in the medical arts will recognize.

As will be readily apparent to one skilled in the art, the effective in vivo dose to be administered and the particular mode of administration will vary depending upon the age, weight and species treated, and the specific use for which the compound or combination of compounds disclosed herein are employed. The determination of effective dose levels, that is the dose levels necessary to achieve the desired result, can be accomplished by one skilled in the art using routine pharmacological methods. Typically, human clinical applications of products are commenced at lower dose levels, with dose level being increased until the desired effect is achieved. Alternatively, acceptable in vitro studies can be used to establish useful doses and routes of administration of the compositions identified by the present methods using established pharmacological methods.

The compositions may, if desired, be presented in a pack or dispenser device which may contain one or more-unit dosage forms containing the active ingredient(s). The pack may for example comprise metal or plastic foil, such as a blister pack. The pack or dispenser device may be accompanied by instructions for administration. The pack or dispenser may also be accompanied with a notice associated with the container in form prescribed by a governmental agency regulating the manufacture, use, or sale of pharmaceuticals, which notice is reflective of approval by the agency of the form of the drug for human or veterinary administration. Such notice, for example, may be the labeling approved by the U.S. Food and Drug Administration for prescription drugs, or the approved product insert. Compositions comprising the compound or combination of compounds disclosed herein formulated in a compatible pharmaceutical carrier may also be prepared, placed in an appropriate container, and labeled for treatment of an indicated condition.

Exemplary compositions for oral administration include suspensions, immediate release, extended release, sustained release, delayed release, and modified release. Such oral compositions may contain one of more of, for example, microcrystalline cellulose for imparting bulk, alginic acid or sodium alginate as a suspending agent, methylcellulose as a viscosity enhancer, and sweeteners or flavoring agents such as those known in the art; dicalcium phosphate, starch, magnesium stearate and/or lactose and/or other excipients, binders, extenders, disintegrants, diluents and lubricants such as those known in the art. Molded tablets, compressed tablets or freeze-dried tablets are exemplary forms which may be used. Exemplary compositions include those formulating the compound or combination of compounds disclosed herein with fast dissolving diluents such as mannitol, lactose, sucrose and/or cyclodextrins. Also included in such formulations may be high molecular weight excipients such as celluloses (avicel) or polyethylene glycols (PEG). Such formulations may also include an excipient to aid mucosal adhesion such as hydroxy propyl cellulose (HPC), hydroxy propyl methyl cellulose (HPMC), sodium carboxy methyl cellulose (SCMC), maleic anhydride copolymer (e.g., Gantrez), and agents to control release such as polyacrylic copolymer (e.g., Carbopol 934). Lubricants, glidants, flavors, coloring agents and stabilizers may also be added for ease of fabrication and use.

For oral administration, the compound(s) or combination of compounds disclosed herein can be formulated readily by combining the active compound with pharmaceutically acceptable carriers well known in the art. Such carriers enable the compound or combination of compounds disclosed herein to be formulated as tablets, film coated tablets, pills, dragées, capsules, liquids, gels, gel caps, pellets, beads, syrups, slurries, suspensions and the like, for oral ingestion by a mammal or human patient to be treated. Pharmaceutical preparations for oral use can be obtained by combining the active compound with solid excipient, optionally grinding a resulting mixture, and processing the mixture of granules, after adding suitable auxiliaries, if desired, to obtain tablets or dragée cores. Suitable excipients are, in particular, fillers such as sugars, including lactose, sucrose, mannitol, or sorbitol; cellulose preparations such as, for example, maize starch, wheat starch, rice starch, potato starch, gelatin, gum tragacanth, methyl cellulose, hydroxypropylmethyl-cellulose, sodium carboxymethylcellulose, and/or polyvinylpyrrolidone (PVP). If desired, disintegrating agents may be added, such as the cross-linked polyvinyl pyrrolidone, agar, or alginic acid or a salt thereof such as sodium alginate. Dragée cores are provided with suitable coatings. For this purpose, concentrated sugar solutions may be used, which may optionally contain gum arabic, talc, polyvinyl pyrrolidone, carbopol gel, polyethylene glycol, and/or titanium dioxide, lacquer solutions, and suitable organic solvents or solvent mixtures. Dyestuffs or pigments may be added to the tablets or dragée coatings for identification or to characterize different combinations of active compound doses. For this purpose, concentrated sugar solutions may be used, which may optionally contain gum arabic, talc, polyvinyl pyrrolidone, carbopol gel, polyethylene glycol, and/or titanium dioxide, lacquer solutions, and suitable organic solvents or solvent mixtures. Dyestuffs or pigments may be added to the tablets or dragée coatings for identification or to characterize different combinations of active compound doses. In addition, stabilizers can be added. All formulations for oral administration should be in dosage forms suitable for such administration. In some embodiments, formulations of the compound(s) or combination of compounds disclosed herein with an acceptable immediate release dissolution profile and a robust, scalable method of manufacture are disclosed.

Pharmaceutical preparations which can be used orally include push-fit capsules made of gelatin, as well as soft, sealed capsules made of gelatin and a plasticizer, such as glycerol or sorbitol. The push-fit capsules can contain the active ingredients in admixture with filler such as lactose, binders such as starches, and/or lubricants such as talc or magnesium stearate and, optionally, stabilizers. In soft capsules, the active compounds may be dissolved or suspended in suitable liquids, such as fatty oils, liquid paraffin, or liquid polyethylene glycols. In addition, stabilizers may be added. All formulations for oral administration should be in dosage forms suitable for such administration.

Further disclosed herein are various pharmaceutical compositions well known in the pharmaceutical art for uses that include intraocular, intranasal, and intraauricular delivery. Suitable penetrants for these uses are generally known in the art. Pharmaceutical compositions for intraocular delivery include aqueous ophthalmic solutions of the active compounds in water-soluble form, such as eyedrops, or in gellan gum (See Shedden, A., et al., *Efficacy and Tolerability of Timolol Maleate Ophthalmic Gel-forming Solution Versus Timolol Ophthalmic Solution in Adults with Open-angle Glaucoma or Ocular Hypertension: A Six-month, Double-masked, Multicenter Study Clinical Therapeutics*, Vol. 23, no. 3 (Mar. 1, 2001), pp. 440-450) or hydrogels (See Mayer, H., et al., *Efficacy of a Novel Hydrogel Formulation in Human Volunteers. Ophthalmologica*, Vol. 210, no. 2 (1996), pp. 101-103); ophthalmic ointments; ophthalmic suspensions, such as microparticulates, drug-containing small polymeric particles that are suspended in a liquid carrier medium (See Joshi, A., *Microparticulates for Ophthalmic Drug Delivery. Journal of Ocular Pharmacology and Therapeutics*, Vol. 10, no. 1 (1994), pp. 29-45), lipid-soluble formulations (See Alm, A., et al., *Effects of Topically Applied PGF2 Alpha and its Isopropylester on Normal and Glaucomatous Human Eyes. Progress in Clinical and Biological Research*, Vol. 312 (1989), pp. 447-458), and microspheres (See Mordenti. J., et al., *Intraocular Pharmacokinetics and Safety of a Humanized Monoclonal Antibody in Rabbits After Intravitreal Administration of a Solution or a PLGA Microsphere Formulation. Toxicological Sciences: An Official Journal of the Society of Toxicology*, Vol. 1 (Nov. 1, 1999), pp. 101-106); and ocular inserts. All of the above-mentioned references are incorporated herein by reference in their entireties. Such suitable pharmaceutical formulations are most often and preferably formulated to be sterile, isotonic and buffered for stability and comfort. Pharmaceutical compositions for intranasal delivery may also include drops and sprays often prepared to simulate in many respects nasal secretions to ensure maintenance of normal ciliary action. As disclosed in Remington, J. P., et al. *Remington's Pharmaceutical Sciences*, 18th Ed., Mack Publishing Co., Easton, PA, 1990 which is incorporated herein by reference in its entirety, and well-known to those skilled in the art, suitable formulations are most often and preferably isotonic, slightly buffered to maintain a pH of 5.5 to 6.5, and most often and preferably include antimicrobial preservatives and appropriate drug stabilizers. Pharmaceutical formulations for intraauricular delivery include suspensions and ointments for topical application in the ear. Common solvents for such aural formulations include glycerin and water.

Exemplary compositions for parenteral administration include injectable solutions, suspensions, and infusion, which may contain, for example, suitable non-toxic, parenterally acceptable diluents or solvents, such as mannitol, 1,3-butanediol, water, Ringer's solution, an isotonic sodium chloride solution, or other suitable dispersing or wetting and suspending agents, including synthetic mono- or diglycerides, and fatty acids, including oleic acid. Pharmaceutical formulations for parenteral administration also include aqueous solutions of the active compounds or solids in water-soluble form. In some embodiments, formulations may comprise ketamine or a combination of ketamine and NAP as well as a divalent or trivalent cation (e.g., $Ca^{2+}$, $Mg^{2+}$, $Zn^{2+}$). In various embodiments, the molar ratio of cation to ketamine or a combination of ketamine and NAP (or ketamine and NAP individually) can be greater than 3:1, 4:1, or 5:1. In some embodiments, the molar ratio is above 5:1. Additionally, suspensions of the active compounds may be prepared as appropriate oily injection suspensions. Suitable lipophilic solvents or vehicles include fatty oils such as sesame oil, or other organic oils such as soybean, grapefruit or almond oils, or synthetic fatty acid esters, such as ethyl oleate or triglycerides, or liposomes. Aqueous injection suspensions may contain substances which increase the viscosity of the suspension, such as sodium carboxymethyl cellulose, sorbitol, or dextran. Optionally, the suspension may also contain suitable stabilizers or agents that increase the solubility of the compounds to allow for the preparation of highly concentrated solutions. Formulations for injection may be presented in unit dosage form, e.g., in ampoules or in multi-dose containers, with an added preservative. The compositions may take such forms as suspensions, solutions or emulsions in oily or aqueous vehicles, and may contain formulatory agents such as suspending, stabilizing and/or dispersing agents. Alternatively, the active ingredient may be in powder form for constitution with a suitable vehicle, e.g., sterile pyrogen-free water, before use.

Exemplary compositions for rectal administration include suppositories or retention enemas which may contain, for example, a suitable non-irritating excipient, such as cocoa butter, synthetic glyceride esters or polyethylene glycols, which are solid at ordinary temperatures, but liquefy and/or dissolve in the rectal cavity to release the drug.

Exemplary compositions for topical administration include a topical carrier such as Plastibase (mineral oil gelled with polyethylene). For example, the compound or combination of compounds disclosed herein may be administered topically to treat peripheral vascular diseases and as such may be formulated as a cream or ointment.

Exemplary compositions for transmucosal administration include penetrants appropriate to the barrier to be permeated may be used in the formulation.

For buccal administration, the compositions may take the form of tablets or lozenges formulated in conventional manner.

In some embodiments the compositions described herein are incorporated into a patch or film for transdermal drug delivery. In some embodiments, such patches further comprise a porous or resorbable film, an active pharmaceutical agent, and optionally a transdermal carrier or penetration enhancer. Exemplary transdermal carriers include dimethylsulfoxide; 1-dodecylazacycloheptan-2-one or laurocapran: dimethylacetamide; dimethylformamide; lauric acid; myristic acid; capric acid; caprylic acid; oleic acid; diethylene glycol; tetraethylene glycol; terpenes: essential oils of *eucalyptus, chenopodium* and ylang-ylang; dimethyl isosorbide; Oxazolidinones such as 4-decyloxazolidin-2-one: 2-pyrrolidone; N-methyl-2-pyrrolidone; urea; EDTA; Sodium Glycolate; polysorbates; sodium deoxycholate; polyethylene glycol; PLA/PLGA nanoparticles; polymer nanoparticles; block-copolymer nanoparticles, especially those comprising Pluronic®-type polyethylene oxide-block-polypropylene oxide copolymers; porous silica nanoparticles; metallic nanoparticles, especially those comprising gold, palladium, and iron; metal oxide nanoparticles, especially those comprising $TiO_2$ and $Al_2O_3$; short chain alcohols such as ethanol, propanol, and butanol; and oils such as mineral oil and coconut oil. In some embodiments the compositions described herein are incorporated into an adhesive for a transdermal patch. In some further embodiments, the compositions described herein are incorporated into a resorbable film. In some embodiments, the active pharmaceutical agent is contained within a separate reservoir layer. In some embodiments, the transdermal patch consists of a single layer. In some embodiments, the transdermal patch is constructed in multiple layers.

Exemplary compositions for injection can be prepared in conventional forms, either as liquid solutions or suspensions, solid forms suitable for solution or suspension in liquid prior to injection, or as emulsions. Suitable excipients are, for example, water, saline, dextrose, mannitol, lactose, lecithin, albumin, sodium glutamate, cysteine hydrochloride, and the like. In addition, if desired, the injectable pharmaceutical compositions may contain minor amounts of nontoxic auxiliary substances, such as wetting agents, pH buffering agents, and the like. Physiologically compatible buffers include, but are not limited to, Hanks's solution, Ringer's solution, or physiological saline buffer. If desired, absorption enhancing preparations (for example, liposomes), may be utilized.

Exemplary compositions for nasal aerosol or inhalation administration include solutions in saline which may contain, for example, benzyl alcohol or other suitable preservatives, absorption promoters to enhance bioavailability, and/or other solubilizing or dispersing agents such as those known in the art. For administration by inhalation, the compound or combination of compounds disclosed herein is conveniently delivered in the form of an aerosol spray presentation from pressurized packs or a nebulizer, with the use of a suitable propellant, e.g., dichlorodifluoromethane, trichlorofluoromethane, dichlorotetrafluoroethane, carbon dioxide or other suitable gas. In the case of a pressurized aerosol the dose unit may be determined by providing a valve to deliver a metered amount. Capsules and cartridges of, e.g., gelatin for use in an inhaler or insufflator may be formulated containing a powder mix of the compound and a suitable powder base such as lactose or starch.

In addition to the formulations described previously, the compound or combination of compounds disclosed herein may also be formulated as a depot preparation. Such long acting formulations may be administered by implantation (for example subcutaneously or intramuscularly) or by intramuscular injection. Thus, for example, the compound or combination of compounds disclosed herein may be formulated with suitable polymeric or hydrophobic materials (for example as an emulsion in an acceptable oil) or ion exchange resins, or as sparingly soluble derivatives, for example, as a sparingly soluble salt.

For hydrophobic compounds, a suitable pharmaceutical carrier may be a cosolvent system comprising benzyl alcohol, a nonpolar surfactant, a water-miscible organic polymer, and an aqueous phase. A common cosolvent system used is the VPD co-solvent system, which is a solution of 3% w/v benzyl alcohol, 8% w/v of the nonpolar surfactant Polysorbate 80™, and 65% w/v polyethylene glycol 300, made up to volume in absolute ethanol. Naturally, the proportions of a co-solvent system may be varied considerably without destroying its solubility and toxicity characteristics. Furthermore, the identity of the co-solvent components may be varied: for example, other low-toxicity nonpolar surfactants may be used instead of POLYSORBATE 80™; the fraction size of polyethylene glycol may be varied; other biocompatible polymers may replace polyethylene glycol, e.g., polyvinyl pyrrolidone; and other sugars or polysaccharides may substitute for dextrose.

Alternatively, other delivery systems for hydrophobic pharmaceutical compounds may be employed. Liposomes and emulsions are well known examples of delivery vehicles or carriers for hydrophobic drugs. Certain organic solvents such as dimethylsulfoxide also may be employed, although usually at the cost of greater toxicity. Additionally, the compounds may be delivered using a sustained-release system, such as semipermeable matrices of solid hydrophobic polymers containing the therapeutic agent. Various sustained-release materials have been established and are well known by those skilled in the art. Sustained-release capsules may, depending on their chemical nature, release the compounds for a few weeks up to over 100 days. Depending on the chemical nature and the biological stability of the therapeutic reagent, additional strategies for protein stabilization may be employed.

Agents intended to be administered intracellularly may be administered using techniques well known to those of ordinary skill in the art. For example, such agents may be encapsulated into liposomes. All molecules present in an aqueous solution at the time of liposome formation are incorporated into the aqueous interior. The liposomal contents are both protected from the external micro-environment and, because liposomes fuse with cell membranes, are efficiently delivered into the cell cytoplasm. The liposome may be coated with a tissue-specific antibody. The liposomes will be targeted to and taken up selectively by the desired organ. Alternatively, small hydrophobic organic molecules may be directly administered intracellularly.

Additional therapeutic or diagnostic agents may be incorporated into the pharmaceutical compositions. Alternatively, or additionally, pharmaceutical compositions may be combined with other compositions that contain other therapeutic or diagnostic agents.

The pharmaceutical compositions described herein can be administered to a cell, mammal, or human per se, or in pharmaceutical compositions where they are mixed with other active ingredients, as in combination therapy, or suitable carriers or excipient(s). Techniques for formulation and administration of the compound or combination of compounds disclosed herein may be found in Remington, J. P., et al., *Remington's Pharmaceutical Sciences,* 18th Ed, Mack Publishing Co., Easton, PA, 1990.

Excipients

The compound(s) or combination of compounds disclosed herein can be formulated readily, for example, by combining the drug substance with any suitable pharmaceutically acceptable excipient(s) for example, but not limited to, binders, diluents, disintegrants, lubricants, fillers, carriers, coatings, glidants, flavors, color additives, and the like, as set forth below. Such compositions can be prepared for storage and for subsequent processing.

Acceptable excipients for therapeutic use are well known in the pharmaceutical art, and are described, for example, in Rowe, R. C., et al., *Handbook of Pharmaceutical Excipients*. 5$^{th}$ Ed., Libros Digitales-Pharmaceutical Press, 2009 and Remington, J. P. *Remington: The Science and Practice of Pharmacy*. Vol. 1. Lippincott Williams & Wilkins, 2006, each of which is hereby incorporated in its entirety. Excipients can include, by way of illustration and not limitation, diluents, disintegrants, binding agents, wetting agents, polymers, lubricants, glidants, coatings, sweetens, solubilizing agents, substances added to mask or counteract a disagreeable taste or odor, flavors, colorants, fragrances, and substances added to improve appearance of the composition.

The compositions and formulations can include any other agents that provide improved transfer, delivery, tolerance, and the like. These compositions and formulations can include, for example, powders, pastes, jellies, waxes, oils, lipids, lipid (cationic or anionic) containing vesicles (such as Lipofectin™), DNA conjugates, anhydrous absorption pastes, oil-in-water and water-in-oil emulsions, emulsions carbowax (polyethylene glycols of various molecular weights), semi-solid gels, and semi-solid mixtures containing carbowax.

In some embodiments, the composition disclosed herein can comprise at least 0.1% (w/w), 0.2% (w/w), 0.3% (w/w), 0.4% (w/w), 0.5% (w/w), 0.6% (w/w), 0.7% (w/w), 0.8% (w/w), 0.9% (w/w), 1.0% (w/w), 1.1% (w/w), or 1.2% (w/v) of a preservative. In some embodiments, the topical composition disclosed herein can comprise 0.1% (w/w), 0.2% (w/w), 0.3% (w/w), 0.4% (w/w), 0.5% (w/w), 0.6% (w/w), 0.7% (w/v), 0.8% (w/w), 0.9% (w/w), 1.0% (w/w), 1.1% (w/w), 1.2% (w/w), 1.5% (w/w), 2% (w/w), 3% (w/w), 4% (w/w), 5% (w/w), 6% (w/w), 7% (w/w), 8% (w/w), 9% (w/w), 10% (w/w), 20% (w/w) or 30% (w/w) of a preservative or a range defined by any two of the preceding values. In some embodiments, the preservative can include one or more components, two or more components or three or more components.

In some embodiments, the composition disclosed herein can comprise at least 0.1% (w/w), 0.2% (w/w), 0.3% (w/w), 0.4% (w/w), 0.5% (w/w). 0.6% (w/w), 0.7% (w/w), 0.8% (w/w), 0.9% (w/w), 1.0% (w/w), 1.1% (w/w), or 1.2% (w/w) of a preservative including phenoxyethanol, propyl paraben, and methyl paraben. In some embodiments, the topical composition disclosed herein can comprise 0.1% (w/w), 0.2% (w/w). 0.3% (w/w), 0.4% (w/w), 0.5% (w/w), 0.6% (w/w), 0.7% (w/w), 0.8% (w/w), 0.9% (w/w), 1.0% (w/w), 1.1% (w/w), 1.2% (w/w), 1.5% (w/w), 2% (w/w), 3% (w/w), 4% (w/w), 5% (w/w), 6% (w/w), 7% (w/w), 8% (w/w), 9% (w/w), 10% (w/w), 20% (w/w) or 30% (w/w) of a preservative including phenoxyethanol, propyl paraben, and methyl paraben or a range defined by any two of the preceding values.

In some embodiments, the composition may include colorants, deodorants, fragrances, perfumes, anti-foaming agents, lubricants, natural moisturizing agents, skin conditioning agents, skin protectants, skin benefit agents, solvents, solubilizing agents, suspending agents, wetting agents, humectants, propellants, dyes, pigments, and combinations thereof.

In some embodiments, the composition may include additional components added to enhance the odor, texture or color of the composition. For example, fragrances may be added to enhance odor. For example, emulsifiers or inert spheres may be added to enhance texture. For example, colorants may be added to enhance color.

Any of the foregoing mixtures can be appropriate in treatments and therapies in accordance with the disclosure herein, provided that the active ingredient in the formulation is not inactivated by the formulation and the formulation is physiologically compatible and tolerable with the route of administration. See Baldrick, P., *Pharmaceutical Excipient Development: The Need for Preclinical Guidance. Regulatory Toxicology and Pharmacology*, Vol, 32, no. 2 (Oct. 1, 2000), pp. 210-218; Charman, W. N., *Lipids, Lipophilic Drugs, and Oral Drug Delivery—Some Emerging Concepts. Journal of Pharmaceutical Sciences*, Vol. 89, no. 8 (Aug. 1, 2000), pp. 967-978, and the citations therein for additional information related to formulations, excipients and carriers well known to pharmaceutical chemists.

In some embodiments, one or more, or any combination of the listed excipients can be specifically included or excluded from the formulations and/or methods disclosed herein. As will be appreciated by those of skill in the art, the amounts of excipients will be determined by drug dosage form and dosage form size.

Lubricants

In some embodiments, lubricants are employed in the manufacture of certain dosage forms. For example, a lubricant will often be employed when producing tablets. In some embodiments, a lubricant can be added just before the tableting step and can be mixed with the formulation for a minimum period of time to obtain good dispersal. In some embodiments, one or more lubricants can be used. Examples of suitable lubricants include, but are not limited to, magnesium stearate, calcium stearate, zinc stearate, stearic acid, talc, glyceryl behenate, polyethylene glycol, polyethylene oxide polymers (for example, available under the registered trademarks of Carbowax® for polyethylene glycol and Polyox® for polyethylene oxide from Dow Chemical Company, Midland, Mich.), sodium lauryl sulfate, magnesium lauryl sulfate, sodium oleate, sodium stearyl fumarate, DL-leucine, colloidal silica, and others as known in the art. Typical lubricants are magnesium stearate, calcium stearate, zinc stearate and mixtures of magnesium stearate with sodium lauryl sulfate.

Color Additives

In some embodiments, color additives also can be included. The colorants can be used in amounts sufficient to distinguish dosage form strengths. Preferably, color additives approved for use in drugs (21 CFR 74, which is incorporated herein by reference in its entirety) are added to the commercial formulations to differentiate tablet strengths. The use of other pharmaceutically acceptable colorants and combinations thereof are encompassed by the current disclosure.

Binders

Binders can be used, for example, to impart cohesive qualities to a formulation, and thus ensure that the resulting dosage form remains intact after compaction. Suitable binder materials include, but are not limited to, microcrystalline cellulose, gelatin, sugars (including, for example, sucrose, glucose, dextrose and maltodextrin), polyethylene glycol, waxes, natural and synthetic gums, polyvinylpyrrolidone, pregelatinized starch, povidone, cellulosic polymers (including, for example, hydroxypropyl cellulose (HPC), hydroxypropyl methylcellulose (HPMC), methyl cellulose, hydroxyethyl cellulose, and the like), hydroxypropyl cellulose (HPC), and the like. Accordingly, in some embodiments, the formulations disclosed herein can include at least one binder to enhance the compressibility of the major excipient(s). In some embodiments, the binder(s) is(are) sprayed on from solution, e.g., wet granulation, to increase binding activity.

Disintegrants

In some embodiments, disintegrants are used, for example, to facilitate tablet disintegration after administration, and are generally starches, clays, celluloses, algins, gums, or crosslinked polymers. Suitable disintegrants include, but are not limited to, crosslinked polyvinylpyrrolidone (PVP-XL), sodium starch glycolate, alginic acid, methacrylic acid DYB, microcrystalline cellulose, crospovidone, polacriline potassium, sodium starch glycolate, starch, pregelatinized starch, croscarmellose sodium, and the like. If desired, the pharmaceutical formulation can also contain minor amounts of nontoxic auxiliary substances such as wetting or emulsifying agents, pH buffering agents and the like, for example, sodium acetate, sorbitan monolaurate, triethanolamine sodium acetate, triethanolamine oleate, sodium lauryl sulfate, dioctyl sodium sulfosuccinate, polyoxyethylene sorbitan fatty acid esters, etc. and the like.

Coatings

In some embodiments, the formulations can include a coating, for example, a film coating. Where film coatings are involved, coating preparations can include, for example, a film-forming polymer, a plasticizer, or the like. Also, the coatings can include pigments and/or opacifiers. Non-limiting examples of film-forming polymers include hydroxypropyl methylcellulose, hydroxypropyl cellulose, methylcellulose, polyvinyl pyrrolidine, and starches. Non-limiting examples of plasticizers include polyethylene glycol, tributyl citrate, dibutyl sebecate, castor oil, and acetylated monoglyceride. Furthermore, non-limiting examples of pigments and opacifiers include iron oxides of various colors, lake dyes of many colors, titanium dioxide, and the like.

Diluents

In some embodiments, diluents are used, and are generally selected from one or more of the compounds sucrose, fructose, glucose, galactose, lactose, maltose, invert sugar, calcium carbonate, lactose, starch, microcrystalline cellulose, lactose monohydrate, calcium hydrogen phosphate, anhydrous calcium hydrogen phosphate, a pharmaceutically acceptable polyol such as xylitol, sorbitol, maltitol, mannitol, isomalt and glycerol, polydextrose, starch, or the like, or any mixture thereof.

Surfactants

In some embodiments, surfactants are used. The use of surfactants as wetting agents in oral drug forms is described in the literature, for example in Sucker. H., et al., *Pharmazeutische Technologie*. Stuttgart: Thieme, 1978. p. 310. It is also possible to use surfactants, inter alia, to improve the permeation and bioavailability of pharmaceutical active compounds. See LeCluyse, E. L., et al., *In Vitro Models for Selection of Development Candidates. Permeability Studies to Define Mechanisms of Absorption Enhancement, Advanced Drug Delivery Reviews*, Vol. 23, no. 1-3 (Jan. 15, 1997), pp. 163-183. Examples of surfactants include, but are not limited to, anionic surfactants, non-ionic surfactants, zwitterionic surfactants and a mixture thereof. Preferably, the surfactants is selected from the group consisting of poly(oxyethylene) sorbitan fatty acid ester, poly(oxyethylene) stearate, poly(oxyethylene) alkyl ether, polyglycolated glyceride, poly(oxyethylene) castor oil, sorbitan fatty acid ester, poloxamer, fatty acid salt, bile salt, alkyl sulfate, lecithin, mixed micelle of bile salt and lecithin, glucose ester vitamin E TPGS (D-α-tocopheryl polyethylene glycol 1000 succinate), sodium lauryl sulfate, and the like, and a mixture thereof.

Glidants

In some embodiments, glidants are used. Examples of glidants which may be used include, but are not limited to, colloidal silicon dioxide, magnesium trisilicate, powdered cellulose, starch, talc and calcium phosphate, or the like, and mixtures thereof.

Suitable routes of administration may, for example, include oral, rectal, transmucosal, topical, or intestinal administration; parenteral delivery, including intramuscular, subcutaneous, intravenous, intramedullary injections, as well as intrathecal, direct intraventricular, intraperitoneal, intranasal, or intraocular injections. The compound or combination of compounds disclosed herein can also be administered in sustained or controlled release dosage forms, including depot injections, osmotic pumps, pills, transdermal (including electrotransport) patches, and the like, for prolonged and/or timed, pulsed administration at a predetermined rate.

The pharmaceutical compositions of the present disclosure may be manufactured in a manner that is itself known, e.g., by means of conventional mixing, dissolving, granulating, dragée-making, levigating, emulsifying, encapsulating, entrapping or tabletting processes.

Pharmaceutical compositions for use in accordance with the present disclosure thus may be formulated in conventional manner using one or more physiologically acceptable carriers comprising excipients and auxiliaries which facilitate processing of the active compounds into preparations which can be used pharmaceutically. Proper formulation is dependent upon the route of administration chosen. Any of the well-known techniques, carriers, and excipients may be used as suitable and as understood in the art, e.g., in Remington's Pharmaceutical Sciences, above.

What is claimed is:

1. A method of increasing the expression of Activity-Dependent Neuroprotector Protein (ADNP) in at least one mammalian cell, the method comprising:
    administering to a mammal a combination of ketamine and ADNP-Derived Neuroprotective Peptide (NAP),
    wherein the mammal is in need of treatment for a condition related to the insufficient ADNP expression level,
    wherein the condition is present in the mammal prior to administration of the combination,
    wherein an effective amount of the ketamine per dose in the combination is in a sub anesthetic range and is more than about 0.01 mg/kg and less than about 10 mg/kg, and an effective amount of the NAP per dose in the combination is more than about 0.01 mg/kg and less than about 20 mg/kg.

2. The method of claim 1, wherein the insufficient ADNP expression level is related to:
    an insufficient expression level of an ADNP gene or a Forkhead Box Protein P1 (FOXP1) gene; or
    a genetic alteration of the ADNP gene or the FOXP1 gene, wherein the genetic alteration comprises a germ line mutation, a somatic mutation, or a copy number variation.

3. The method of claim 1, wherein the insufficient ADNP expression level is related to an insufficient expression level of the Activity-Dependent Neuroprotector Homeobox protein, wherein the insufficient level of the Activity-Dependent Neuroprotector Homeobox protein is related to a neurodevelopmental dysfunction, an autism spectrum disorder (ASD), an intellectual impairment, a learning deficit, a sensory processing disorder, a sensation-seeking behavior, a delayed speech development, a delayed language development, a neurological speech impairment, a motor dysfunction, an impaired social interaction, a urinary incontinence, an occurrence of abnormal temper tantrums, an attention deficit and hyperactivity, a sleep disturbance, an occurrence of seizures, or a combination thereof.

4. The method of claim 1, wherein the condition is Autism Spectrum Disorder (ASD), ADNP Syndrome, Alzheimer's Disease, or Schizophrenia.

5. The method of claim 1, wherein the ketamine and NAP are administered with another pharmaceutical active agent, in at least one pharmaceutical composition, orally, topically, or parenterally intramuscularly, subcutaneously, or intravenously, in an aerosolized form, in a powdered form, in a liquid form, intranasally, in a single pharmaceutical composition, separately within about 30 minutes or less of each other, separately according to a schedule, one or more times daily, one or more times weekly, as needed, or co-administered in a single pharmaceutical composition, separately within about 30 minutes or less of each other, separately according to a schedule, one or more times daily, one or more times weekly, or as needed.

6. The method of claim 1, wherein the effective amount of ketamine in the combination is more than about 0.01 mg/kg and less than about 5 mg/kg, about 5.0 mg/kg, or about 0.5 mg/kg.

7. The method of claim 1, wherein the combination of ketamine and NAP increases the expression level of the ADNP while preventing a ketamine-induced neurotoxic effect.

8. A method of increasing an expression level of Activity-Dependent Neuroprotector Protein (ADNP) in a mammal, the method comprising:
 administering to a mammal in need of treatment for a condition related to an insufficient ADNP expression level an effective amount of ketamine,
 wherein the effective amount of the ketamine per dose is in a sub anesthetic range and is more than about 0.01 mg/kg and less than about 5 mg/kg, about 5.0 mg/kg, or about 0.5 mg/kg,
 wherein the condition is Autism Spectrum Disorder (ASD), ADNP syndrome, Alzheimer's Disease, or Schizophrenia, and
 wherein the insufficient ADNP expression level is related to a genetic alteration of the ADNP gene.

9. The method of claim 8, wherein the insufficient ADNP expression level is further related to:
 an insufficient expression level of an ADNP gene or an Forkhead Box Protein P1 (FOXP1) gene; or
 a genetic alteration of FOXP1 gene,
 wherein the genetic alteration of the ADNP gene or the FOXP1 gene comprises a germ line mutation, a somatic mutation, or a copy number variation.

10. The method of claim 8, wherein the insufficient ADNP expression level is related to an insufficient expression level of the Activity-Dependent Neuroprotector Homeobox protein.

11. The method of claim 8, wherein the condition comprises a neurodevelopmental delay or a neurological degeneration.

12. The method of claim 8, wherein the ketamine is administered with another pharmaceutical active agent, in at least one pharmaceutical composition, orally, topically, parenterally, intramuscularly, subcutaneously, intravenously, in an aerosolized form, in a powdered form, in a liquid form, intranasally one or more times daily, one or more times weekly, or as needed.

13. The method of claim 1, wherein the effective amount of NAP per dose in the combination corresponds to an amount more than about 0.01 mg/kg and less than about 5 mg/kg.

14. The method of claim 13, wherein the effective amount of the NAP per dose in the combination corresponds to an amount more than about 0.1 mg/kg and less than about 1 mg/kg.

15. The method of claim 4, wherein the condition is ASD.

* * * * *